United States Patent [19]

Schroeder et al.

(10) Patent No.: US 7,200,995 B2
(45) Date of Patent: Apr. 10, 2007

(54) CONTROL SYSTEM FOR DIESEL ENGINE ELEVATED IDLE AND VARIABLE NOZZLE TURBO CONTROL FOR STATIONARY VEHICLES

(75) Inventors: Jamison C Schroeder, Birmingham, MI (US); Jeffrey Johnson, Clarkston, MI (US); Paul W Kelley, Lake Orion, MI (US); James S Baumgartner, Rochester Hills, MI (US); Scott John Fletcher, Haslett, MI (US); Thomas L Bahensky, Plymouth, MI (US); Mark L Dejong, Ann Arbor, MI (US); Jose L Deleon, Madison Heights, MI (US); Brent M Chamberlain, Madison Heights, MI (US)

(73) Assignee: General Motors Corporation, Detroit, MI (US)

( * ) Notice: Subject to any disclaimer, the term of this patent is extended or adjusted under 35 U.S.C. 154(b) by 206 days.

(21) Appl. No.: 11/026,346

(22) Filed: Dec. 30, 2004

(65) Prior Publication Data

US 2006/0144045 A1 Jul. 6, 2006

(51) Int. Cl.
*F02D 23/00* (2006.01)

(52) U.S. Cl. ........................................................ 60/602
(58) Field of Classification Search .......... 60/600–603, 60/611; 123/564
See application file for complete search history.

(56) References Cited

U.S. PATENT DOCUMENTS

| | | | | |
|---|---|---|---|---|
| 4,671,068 A | * | 6/1987 | Moody et al. | 60/602 |
| 6,233,934 B1 | * | 5/2001 | Church et al. | 60/602 |
| 6,272,859 B1 | * | 8/2001 | Barnes et al. | 60/602 |
| 6,279,551 B1 | * | 8/2001 | Iwano et al. | 123/564 |
| 6,925,804 B2 | * | 8/2005 | Longnecker et al. | 60/602 |
| 7,137,252 B2 | * | 11/2006 | Ando et al. | 60/602 |
| 2006/0074542 A1 | * | 4/2006 | Kikutani | 701/103 |

* cited by examiner

*Primary Examiner*—Thai-Ba Trieu
(74) *Attorney, Agent, or Firm*—Christopher DeVries

(57) ABSTRACT

A control system and method for increasing engine temperature for an engine having a variable nozzle turbo (VNT) is provided. An offset idle module generates an offset idle signal. A normal boost module calculates a normal boost. A supplemental boost module calculates a supplemental boost. An offset boost module generates an offset boost signal for the VNT based on the normal boost and the supplemental boost. A control module adjusts engine idle and VNT boost based on the offset idle signal and the offset boost signal.

19 Claims, 4 Drawing Sheets

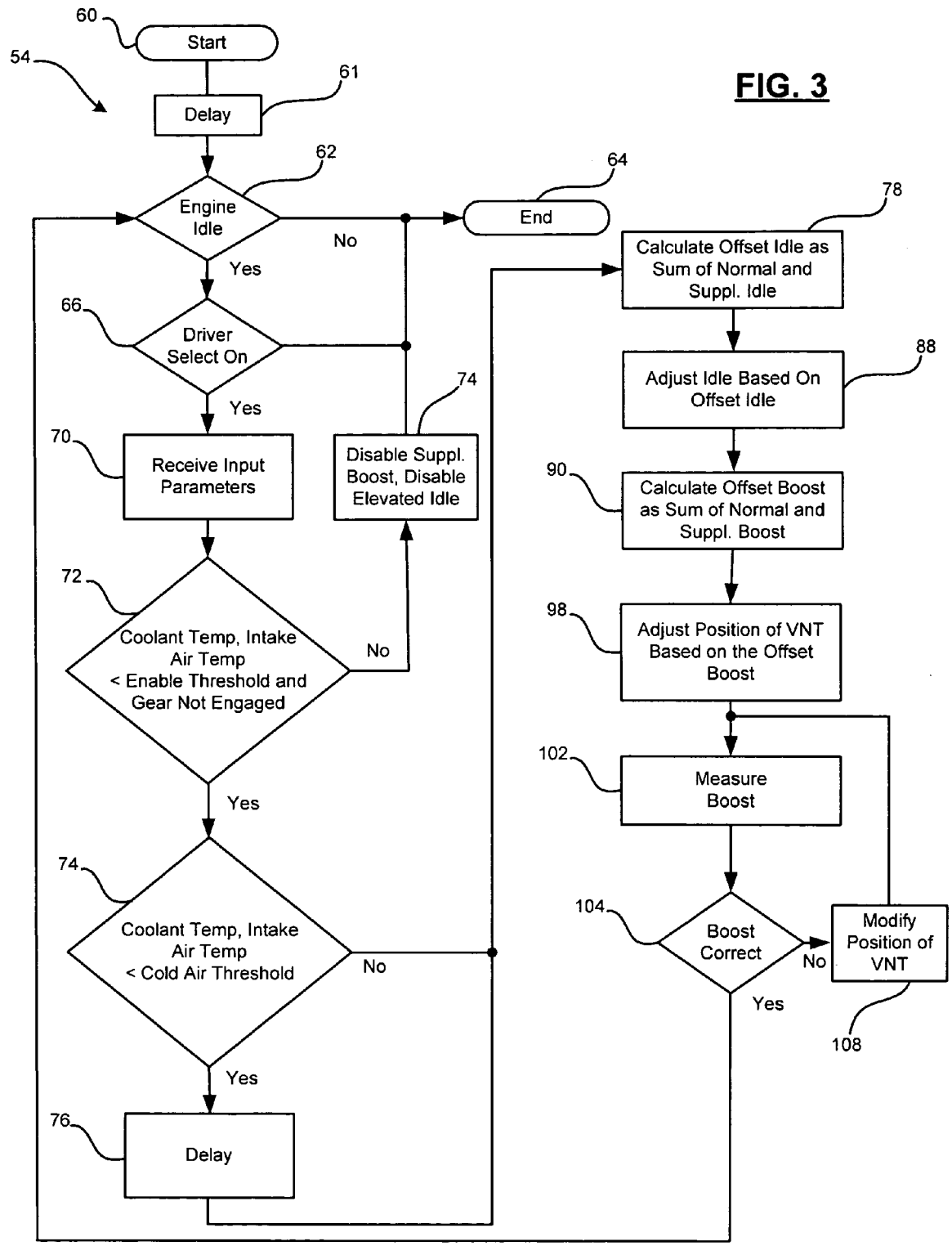

CONTROL SYSTEM FOR DIESEL ENGINE ELEVATED IDLE AND VARIABLE NOZZLE TURBO CONTROL FOR STATIONARY VEHICLES

FIELD OF THE INVENTION

The present invention relates to vehicle control systems and more particularly to vehicle control systems for elevating cabin temperatures in cold weather conditions.

BACKGROUND OF THE INVENTION

Diesel engines typically have higher thermal efficiency and lower fuel consumption rates than gasoline engines due to the increased compression ratio of the diesel combustion process and the higher energy density of diesel fuel. Consequently, diesel engines have a higher thermal burn efficiency which leads to improved fuel economy as compared to gasoline engines with similar output.

Internal combustion engines combust an air and fuel mixture within cylinders of the engine to produce drive torque. Engines can include a turbocharger that increases torque output by delivering additional air into the cylinders. One traditional turbocharger includes a variable nozzle turbo (VNT). VNT's include vanes that can be adjusted to regulate the amount of air delivered through the VNT. The vane position ranges from a fully-open position to a fully-closed position. In the fully-open position, the VNT delivers a minimum amount of air to the engine. In the fully-closed position, the VNT delivers a maximum amount of air to the engine. The vanes can be positioned between the fully-open and fully-closed positions to provide an intermediate amount of air to the engine. A vane solenoid adjusts the vane position based on a vane control signal and a vane control sensor generates a vane position signal indicating the actual vane position.

Diesel engines often include a turbocharger for increased air flow to meet emission requirements and performance standards. Boost (increased air flow) is typically calibrated based on sensed parameters. Typical indicators for engine running conditions are intake manifold temperature, coolant temperature, engine rpm, fuel quantity and injection timing. In diesel engines with waste-gate turbochargers, the boost map is typically set up for normal (warm) engine running conditions with sufficient engine load, normally experienced when the vehicle is moving. Typically, the turbocharger is not capable of producing boost when the vehicle is stationary with minimal engine load. In instances where normal conditions do not apply such as cold/hot ambient conditions, certain engine controls such as injection timing would be adjusted with minimal impact.

While diesel engines offer many advantages, one common drawback is their inability to warm up quickly in cold ambient temperatures. As a result, a vehicle heater sometimes requires a long time to produce heat for the vehicle cabin. Typical methods to accelerate engine warm up times in cold ambient temperatures include incorporating a butterfly valve exhaust after treatment device (exhaust restrictor) or external fuel operated heating device. The exhaust restrictor provides backpressure on the engine, increasing engine load and allowing for increased fuel consumption. Typically, the exhaust restrictor is external and additional to the base engine. In another example a fuel operated heater (FOH) is used. An FOH acts to increase in vehicle heating performance by acting as a space heater. FOHs are usually independent of base engine hardware and controls.

SUMMARY OF THE INVENTION

A control system and method for increasing engine temperature for an engine having a variable nozzle turbo (VNT) is provided. An offset idle module generates an offset idle signal. A normal boost module calculates a normal boost. A supplemental boost module calculates a supplemental boost. An offset boost module generates an offset boost signal for the VNT based on the normal boost and the supplemental boost. A control module adjusts engine idle and VNT boost based on the offset idle signal and the offset boost signal.

According to other features, the operator input includes a signal from an input switch. The supplemental boost is further based on an RPM of the engine. In addition, the supplemental boost is further based on an intake air temperature and a manifold air flow through an intake manifold on the engine, and an injector timing of a fuel injection system associated with the engine.

According to still other features, a position of a plurality of vanes arranged on the turbocharger is determined. An actual boost supplied to the engine is determined. The supplemental boost is modified based on the actual boost and the offset boost.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is a flowchart showing steps for warming up the vehicle engine according to some implementations of the present invention.

DETAILED DESCRIPTION OF THE PREFERRED EMBODIMENTS

The following description of the preferred embodiment is merely exemplary in nature and is in no way intended to limit the invention, its application, or uses. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the term boost refers to an amount of compressed air introduced into an engine by a supplemental forced induction system such as a turbocharger.

Figure 1:
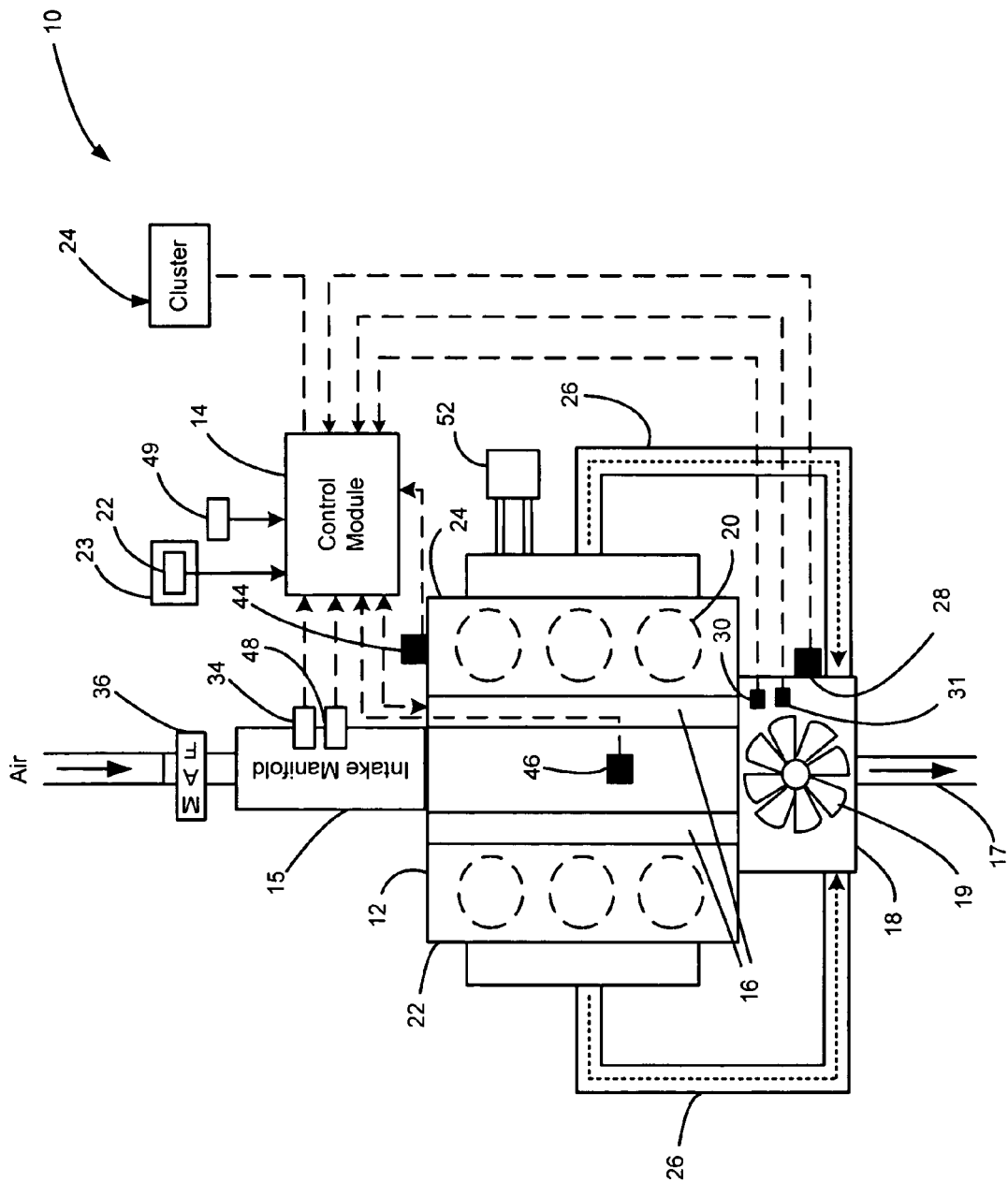
FIG. 1 is a functional block diagram of a VNT control system that warms up a vehicle engine according to some implementations of the present invention.

Referring now to FIG. 1, an exemplary engine control system 10 is schematically illustrated in accordance with the present invention. The engine control system 10 includes an engine 12 and a control module 14. The engine 12 further includes an intake manifold 15, a fuel injection system 16, an exhaust system 17 and a turbocharger 18. The exemplary engine 12 includes six cylinders 20 configured in adjacent cylinder banks 22,24 in a V-type layout. Although FIG. 1 depicts six cylinders (N=6), it can be appreciated that the engine 12 may include additional or fewer cylinders 20. For example, engines having 2, 4, 5, 8, 10, 12 and 16 cylinders are contemplated. It is also anticipated that the engine 12 can have an inline-type cylinder configuration.

Air is drawn into the intake manifold 15 by the inlet vacuum created by the engine intake stroke. Air is drawn into the individual cylinders 20 from the intake manifold 15 and is compressed therein. Fuel is injected by the injection system 16 and is mixed with air. The air/fuel mixture is compressed and the heat of compression and/or electrical energy ignites the air/fuel mixture. Exhaust gas is exhausted from the cylinders 20 through exhaust conduits 26. The exhaust gas drives the turbocharger's turbine blades which in turn drives the turbocharger's compressor blades 19. The blades 19 deliver additional air (boost) to the intake manifold 15 and into the cylinders 20 for combustion.

According to an embodiment of the present invention, the vehicle operator can set the control module 14 to warm up the engine 12 on an accelerated basis, or as referred herein, an accelerated warm-up mode. A switch 22 provided on a device 23 communicates a signal to the control module 14 based on an operator input. In one example, the device 23 may comprise a steering wheel. In such an example, the switch 22 may communicate a signal based on a button depressed in the vehicle cabin such as a button provided on the steering wheel 23. In another example, the switch 22 may communicate a signal based on a pedal stomp sequence (in. such a configuration, the device 23 would comprise an accelerator pedal, clutch pedal or brake pedal). In other features, a menu driven display may be utilized such as through a vehicle instrument cluster 24. The menu driven display may allow the vehicle operator to select, and/or confirm, operation of the engine 12 in the accelerated warm-up mode. In one implementation, the control module may default into the accelerated warm-up mode based on cold ambient conditions. In one example, warm-up mode option preference is stored with the control module 14 for use as an initial setting upon each key-cycle.

The turbocharger 18 is preferably a variable nozzle turbocharger (VNT). The turbocharger 18 includes a plurality of variable position vanes 19 that regulate the amount of air delivered from the vehicle exhaust 17 to the engine 12 based on a signal from the control module 14. More specifically, the vanes 19 are movable between a fully-open position and a fully-closed position. When the vanes 19 are in the fully-closed position, the turbocharger 18 delivers a maximum amount of air into the intake manifold 15 and consequently into the engine 12. When the vanes 19 are in the fully-open position, the turbocharger 18 delivers a minimum amount of air into the engine 12. The amount of delivered air is regulated by selectively positioning the vanes 19 between the fully-open and fully-closed positions.

The turbocharger 18 includes an electronic control vane solenoid 28 that manipulates a flow of hydraulic fluid to a vane actuator (not shown). The vane actuator controls the position of the vanes 19. A vane position sensor 30 generates a vane position signal based on the physical position of the vanes 19. A boost sensor 31 generates a boost signal based on the additional air delivered to the intake manifold 15 by the turbocharger 18. While the turbocharger implemented herein is described as a VNT, it is contemplated that other turbochargers employing electronic control methods may be employed.

A manifold absolute pressure (MAP) sensor 34 is located on the intake manifold 15 and provides a (MAP) signal based on the pressure in the intake manifold 15. A mass air flow (MAF) sensor 36 is located within an air inlet and provides a mass air flow (MAF) signal based on the mass of air flowing into the intake manifold 15. The control module 14 uses the MAF signal to determine the A/F ratio supplied to the engine 12. An RPM sensor 44 provides an engine speed signal. A coolant temperature sensor 46 provides a coolant temperature signal. An intake manifold temperature sensor 48 generates an intake air temperature signal. The control module 14 communicates an injector timing signal to the injection system 16. An accelerator pedal sensor 49 generates a pedal position signal that is output to the control module 14.

The control module 14 controls overall operation of the engine system 10. More specifically, the control module 14 controls engine system operation based on various parameters including, but not limited to, driver input, stability control and the like. The control module 14 can be provided as an Engine Control Module (ECM). The control module 14 regulates operation of the turbocharger 18 by regulating current to the vane solenoid 28. The control module 14 according to an embodiment of the present invention communicates with the vane solenoid 28 to provide an increased flow of air (boost) into the intake manifold 15. An increased flow of air causes the engine temperature to rise and therefore enhance operation of a vehicle heater 52. As a result, cabin temperature may be increased on an accelerated basis.

Figure 2A:
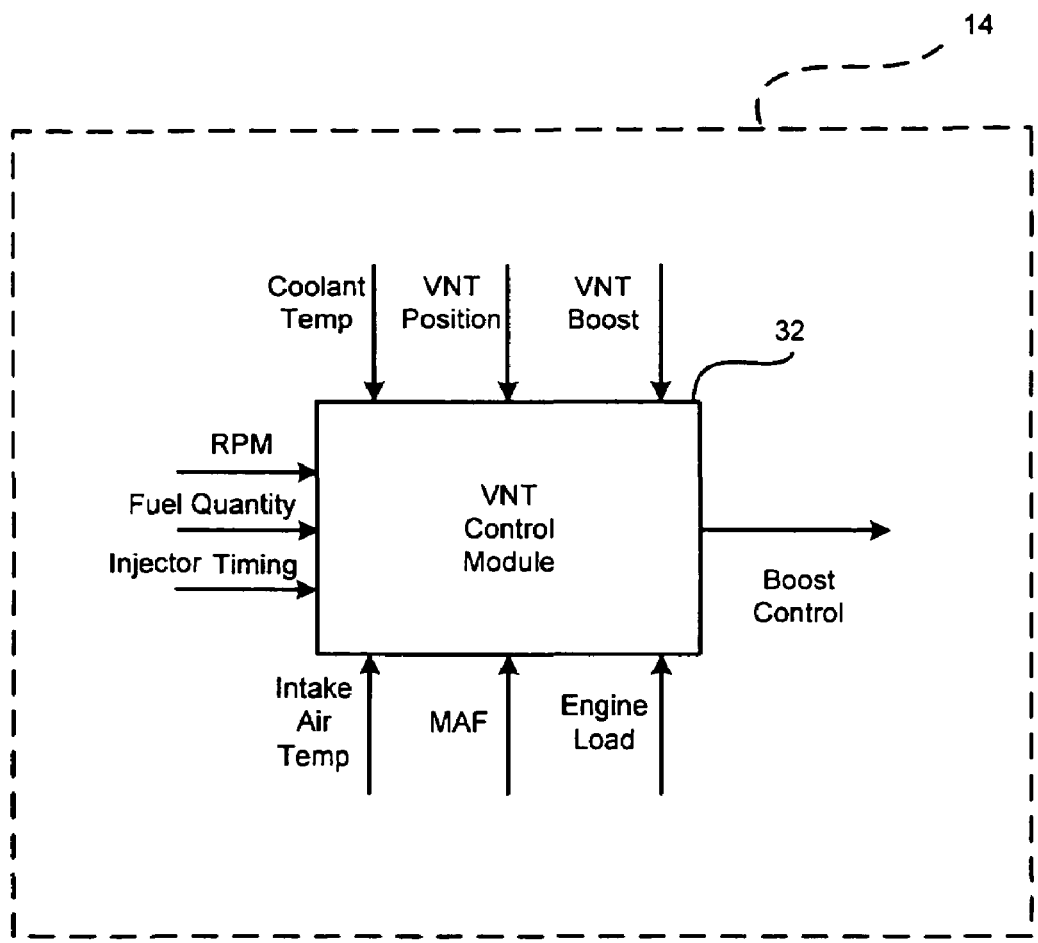
FIG. 2A is a logic diagram illustrating VNT control.
Figure 2B:
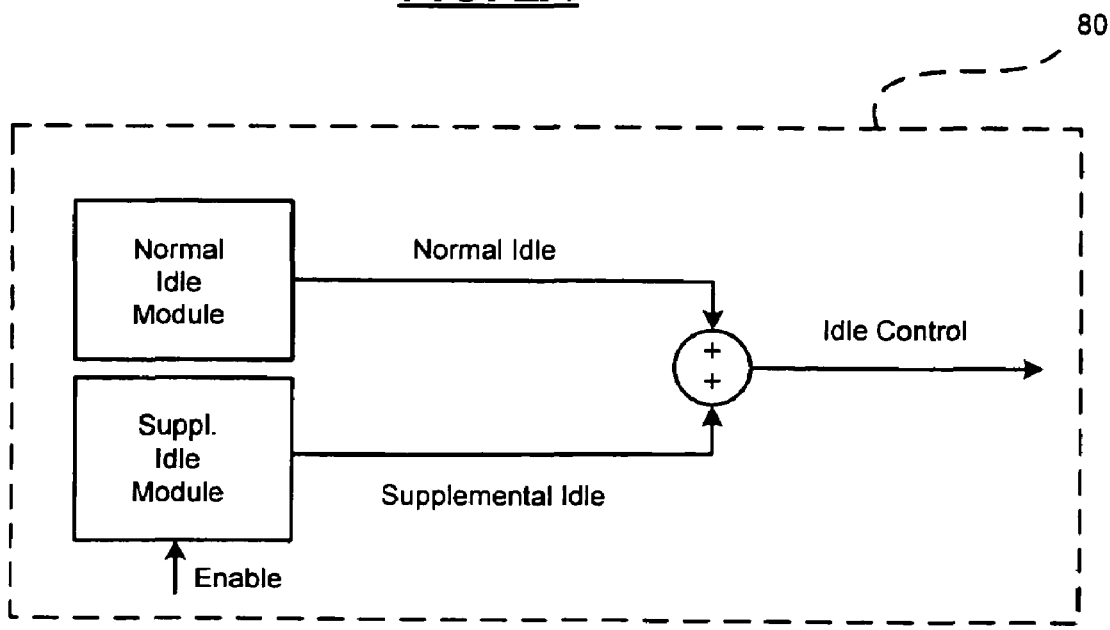
FIG. 2B is a logic diagram illustrating idle control according to some implementations of the present invention.
Figure 2C:
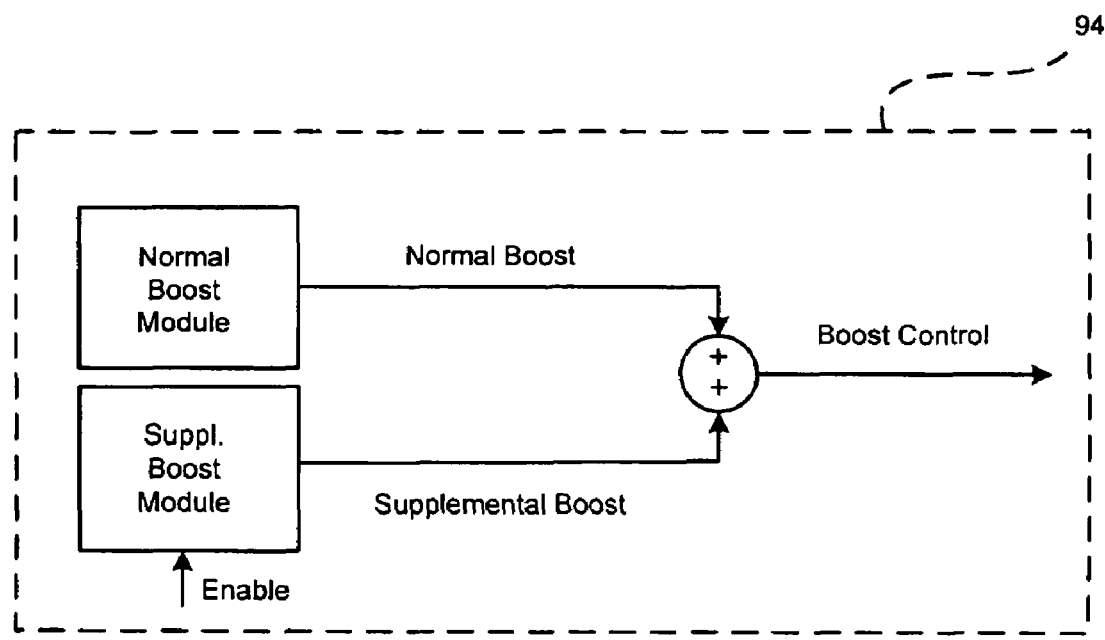
FIG. 2C is a logic diagram illustrating boost control according to some implementations of the present invention.

With reference now to FIGS. 2A–3, a method 54 for increasing engine temperature according to an embodiment of the present invention will be described in further detail. As depicted in FIG. 2A, the control module 14 may include a standalone module or a VNT control module 32. Control begins in step 60. In step 61 a delay is provided to allow for stabilization of the engine 12. In step 62, control determines if the engine 12 is idling. If the engine 12 is not idling, control ends in step 64. If the engine is idling, control determines if the accelerated warm-up mode has been selected in step 66. In one implementation, control saves the warm-up mode to on, based on a previous key cycle so the vehicle operator does not have to select it on each key cycle. If not, control ends in step 64. If the acceleration warm-up mode is selected, control receives input parameters in step 70. In step 70, control determines an intake air temperature based on the signal from the intake air temperature sensor 48. Control also determines a coolant temperature based on the signal from the coolant temperature sensor 46. Additionally, control determines whether the vehicle is in gear such as drive for an automatic transmission or a selected gear for a manual transmission. In one implementation, control verifies a vehicle speed sensor signal (not shown) at or near zero. In addition, control may verify the brake pedal and/or the accelerator pedals are not depressed.

In step 72, control determines whether the measurements are within an acceptable range and whether the vehicle is in gear. For example, if at least one of the intake air temperature, the coolant temperature and/or the vehicle is in gear, control determines that increased engine idle and boost with the VNT is unnecessary and control ends in step 64. In one implementation, control determines that increased idle and boost are unnecessary for at least one of an intake air temperature and a coolant temperature above a calibration threshold. If increased idle and boost are unnecessary, control disables supplemental boost and elevated idle in step 74 and control ends in step 64. It is appreciated that additional measurements may be performed and included as necessary criteria for proceeding with the control method 50.

In step 74, control determines if at least one of the intake air temperature and the coolant temperature is below a cold air threshold. In one example, control determines that if at least one of the intake air temperature and the coolant temperature are below 10 degrees Celsius, control incorporates a delay in step 76. In one implementation the delay may be set to 20 seconds. It is appreciated that the cold air threshold and the delay times are merely exemplary and other values may be used.

Control calculates an offset idle in step 78. An offset idle control module 80 is illustrated in FIG. 2B. The offset idle control module 80 generates an offset idle signal based on the sum of a normal idle and a supplemental idle. The supplemental idle is enabled based on an affirmative output in step 72. The normal idle represents normal air and fuel intake based on normal operating conditions of the engine 12. The supplemental idle is the additional idle that is necessary to facilitate accelerated engine warm-up. The supplemental idle may be based on a calibration and/or current operating conditions of the vehicle. In step 88, control adjusts idle based on the offset idle.

Control calculates an offset boost in step 90. An offset boost control module 94 is illustrated in FIG. 2B. The offset boost control module 94 generates an offset boost signal based on the sum of a normal boost and a supplemental boost. The supplemental boost is enabled based on an affirmative output in step 72. The normal boost represents the airflow injected into the intake manifold 15 by the turbocharger 18 based on normal operating conditions of the engine 12. The normal boost may be estimated based on engine speed (RPM), fuel injector timing, MAF, coolant temperature, intake air temperature and fuel quantity through a lookup table. The supplemental boost is the additional boost that is necessary to increase heater warm-up performance. The supplemental boost may be estimated based on engine speed (RPM), fuel quantity, fuel injector timing, MAF, coolant temperature and intake air temperature through a lookup table.

In step 98, control performs the offset boost with the VNT 18. More specifically, the control module 14 communicates with the vane solenoid 28 to manipulate a flow of hydraulic fluid to the vane actuator based on the calculated offset boost. In step 102, control determines the offset boost supplied by the VNT 18. More specifically, control communicates with the position sensor and the boost sensor to determine an actual boost supplied at the intake manifold 15. In step 104, control determines if the actual boost supplied at the intake manifold 15 is correct based on the desired offset boost. If not, control modifies the signal communicated to the vane solenoid 28 in step 108. If the boost supplied at the intake manifold 15 is correct, control loops to step 62.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A method for operating an internal combustion engine having a turbocharger that generates a boost to said engine, said method comprising:
   determining a coolant temperature of said engine;
   determining a normal idle and a normal boost based on operating conditions of said engine;
   determining a supplemental idle and a supplemental boost based on said coolant temperature;
   determining an offset idle based on said normal idle and said supplemental idle;
   determining an offset boost based on said normal boost and said supplemental boost; and
   modifying an idle output and an output of said turbocharger based on said offset idle and said offset boost.

2. The method of claim 1 wherein said supplemental boost is further based on an RPM of said engine.

3. The method of claim 2 wherein said supplemental boost is further based on an intake air temperature and a manifold air flow through an intake manifold on said engine.

4. The method of claim 3 wherein said supplemental boost is further based on an injector timing of a fuel injection system associated with said engine.

5. The method of claim 3 wherein determining a supplemental idle and a supplemental boost is further based on an operator selected input and wherein said operator selected input is provided by at least one of an instrument cluster, a steering wheel, an accelerator pedal, a clutch pedal and a brake pedal.

6. The method of claim 1 wherein modifying said turbocharger output comprises:
   determining a position of a plurality of vanes arranged on said turbocharger;
   determining an actual boost supplied to said engine; and
   modifying said supplemental boost based on said actual boost and said offset boost.

7. A method for operating an internal combustion engine having a turbocharger that generates a boost to said engine, said method comprising:
   measuring engine parameters including determining a coolant temperature of said engine;
   determining if a supplemental idle and boost control are necessary based on said engine parameters;
   determining a normal idle and boost based on operating conditions of said engine;
   determining a supplemental idle and boost based on said coolant temperature;
   determining an offset idle and boost based on said normal idle and boost and said supplemental idle and boost; and
   modifying an idle output and an output of said turbocharger based on said offset idle and boost.

8. The method of claim 7 wherein determining if said supplemental idle and boost control are necessary includes determining if said intake air temperature and said throttle request are outside a calibration.

9. A control system for increasing engine temperature for an engine having a variable nozzle turbo (VNT), comprising:
   an offset idle module that generates an offset idle signal;
   a normal boost module that calculates a normal boost;
   a supplemental boost module that calculates a supplemental boost;
   an offset boost module that generates an offset boost signal for said VNT based on said normal boost and said supplemental boost; and a control module that adjusts engine idle and VNT boost based on said offset idle signal and said offset boost signal.

10. The control system of claim 9 wherein said supplemental boost is based on a coolant temperature signal.

11. The control system of claim 10 wherein said supplemental boost is further based on an intake air temperature signal and a manifold air flow signal.

12. The control system of claim 11 wherein said supplemental boost is further based on an injector timing signal.

13. The control system of claim 12 wherein said supplemental boost is further based on a fuel quantity delivered to said engine and an RPM of said engine.

14. The control system of claim 13 wherein said control module determines if said supplemental boost output is correct based on a position sensor signal and a boost sensor signal from said turbocharger and wherein said controller modifies said supplemental boost based on said determination.

15. An engine system comprising the control system of claim 14 and further comprising a plurality of variable position vanes associated with said variable nozzle turbo that regulate an amount of air delivered to said engine.

16. The engine system of claim 15, further comprising a vane position sensor that generates said position sensor signal based on a physical position of said vanes.

17. The engine system of claim 16, further comprising a boost sensor that generates said boost sensor signal based on an amount of air delivered to said engine from said variable nozzle turbo.

18. The control system of claim 9 wherein said offset idle signal is based on an operator input and wherein said operator input includes a signal from an input switch.

19. The control system of claim 18 wherein said operator input includes a signal from an operator input through at least one of an instrument cluster, a steering wheel, an accelerator pedal, a clutch pedal and a brake pedal.

* * * * *